Feb. 15, 1966  M. A. ASNES ET AL  3,235,068
COMBINATION CONTAINER AND FILING MEANS FOR GLASS SLIDES
Filed Dec. 15, 1964  3 Sheets-Sheet 1
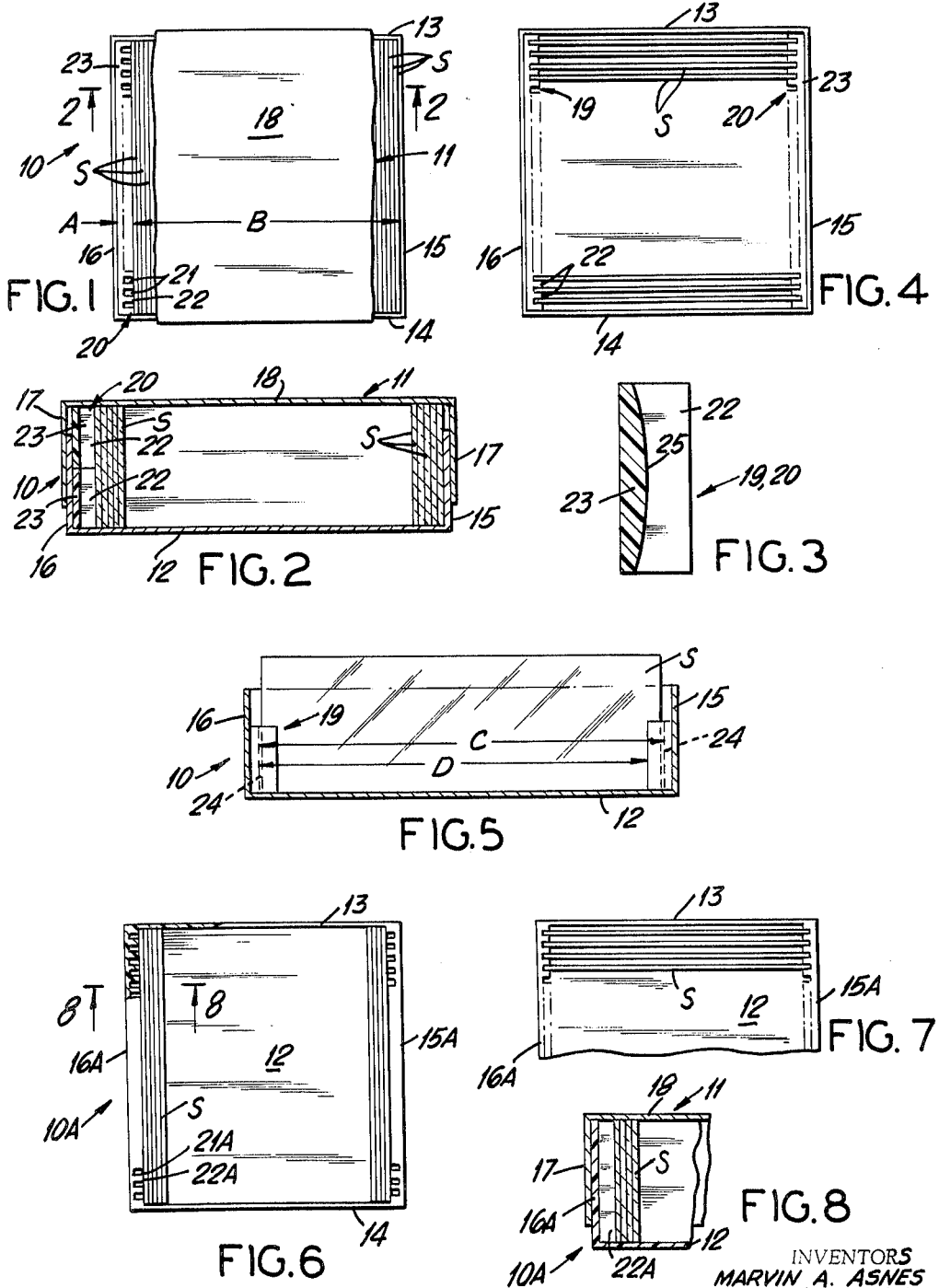
INVENTORS
MARVIN A. ASNES
ERIC H. STRAUS
BY
ATTORNEY.

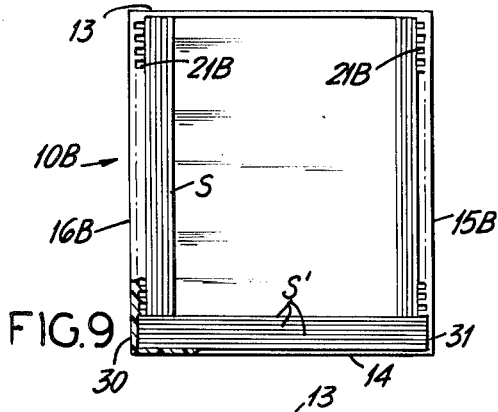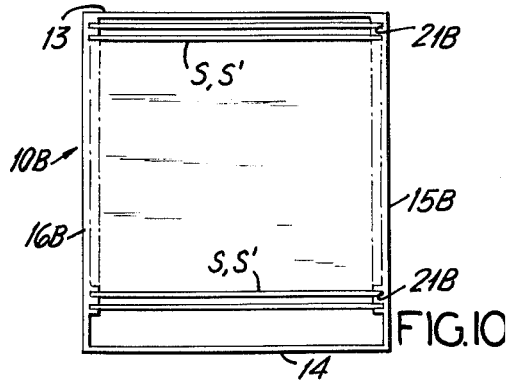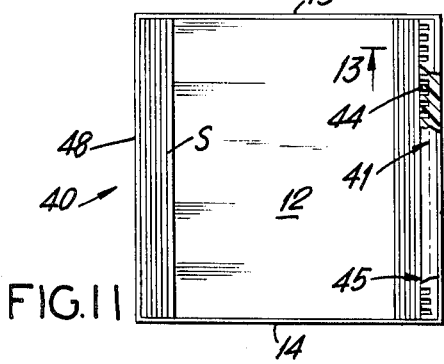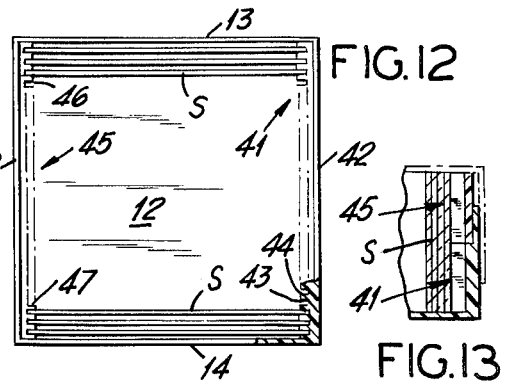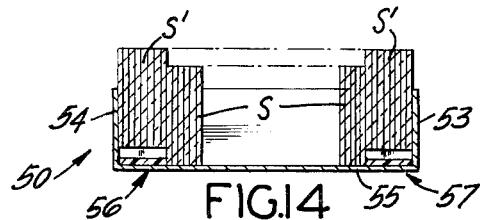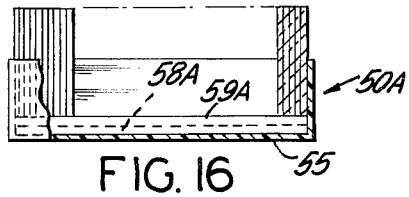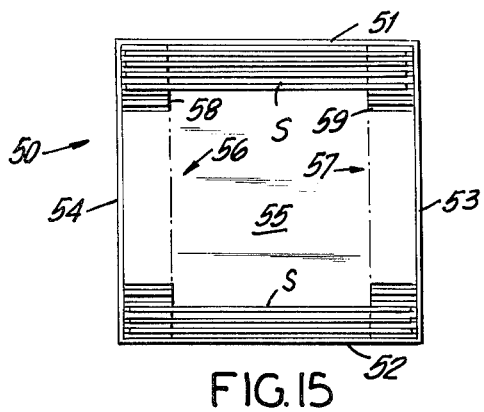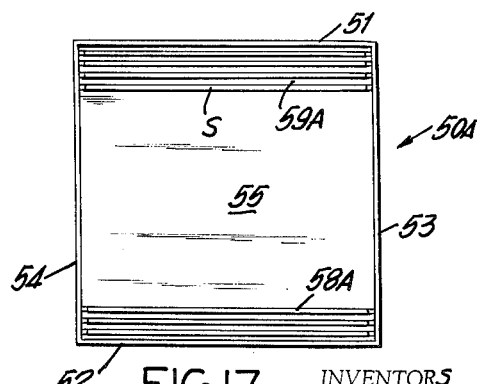

Feb. 15, 1966     M. A. ASNES ET AL     3,235,068
COMBINATION CONTAINER AND FILING MEANS FOR GLASS SLIDES
Filed Dec. 15, 1964     3 Sheets-Sheet 3

INVENTORS
MARVIN A. ASNES
ERIC H. STRAUS
BY
ATTORNEY.

United States Patent Office 3,235,068
Patented Feb. 15, 1966

3,235,068
COMBINATION CONTAINER AND FILING MEANS FOR GLASS SLIDES
Marvin A. Asnes, New York, and Eric H. Straus, Jackson Heights, N.Y., assignors to Clay-Adams, Inc., New York, N.Y., a corporation
Filed Dec. 15, 1964, Ser. No. 418,455
15 Claims. (Cl. 206—62)

This application is a continuation-in-part of application Serial No. 255,987, filed Feb. 4, 1963, now abandoned.

This invention relates to containers for packaging glass microscope slides, such container being adapted to also serve as means for filing a selected number of the glass slides.

Glass microscope slides are usually packaged in stiff cardboard containers in face to face relation. Filler material in the form of paper or cardboard strip may be inserted at one end of the container to afford some protection against shift and breakage due to shock or the like. When such a package is opened, the glass slides are removed for use and the container and filler strip are discarded. The glass slides after tissue samples or smears are applied thereto, are stored in slide boxes of wood or plastic for permanent storage of the same.

An object of this invention is to provide improved packages for glass slides which are convertible after the same have been opened and the slides removed therefrom, into temporary storage and filing means for a selected numbers of slides.

Another object of this invention is to provide an improved package for glass microscope slides which includes filler means for retaining the slides in place within the package, the filler means being of a construction such that the package may be converted after opening and removal of the slides therefrom, into storage and filing means for a selected number of slides.

A further object of this invention is to provide in combination with a container for glass microscope slides, a pair of filler strips having transverse grooves, which strips are normally disposed at one end of the container to retain the pack of contacting glass slides in a tightly packaged condition; the strips being disposable in opposed relation at opposite ends of the container when the slides have been removed therefrom, the grooves in the strips being in respective longitudinal alignment to receive therein processed slides for storage and filing.

Still another object of this invention is to provide a container and filler strips of the character described, wherein dimensions of the container and the strips are correlated to allow a given number of slides to be tightly packed while in a given position within the container, and further, to allow a selected number of slides to be conveniently filed and stored in the same container, in another position therein, after the original pack of slides have been removed therefrom.

Yet a further object of this invention is to provide container structures for glass slides having removable or fixed elements therein which are adapted to allow individual slides to be filed and stored in spaced relation to each other by means of such elements of the container structures.

Other objects of this invention will in part be obvious and in part hereinafter pointed out.

In the drawing, FIG. 1 is a top plan view of a container embodying the invention, showing the same in its normal filled condition, and with parts broken away;

FIG. 2 is a transverse sectional view taken on the line 2—2 of FIG. 1;

FIG. 3 is a vertical, enlarged sectional view taken through a portion of the filler strip;

FIG. 4 is a top plan view similar to that of FIG. 1, with the cover removed and the filler strips rearranged within the container in their filing and storage position;

FIG. 5 is a transverse sectional view taken on the line 5—5 of FIG. 4.

FIG. 6 is a top plan view showing an alternative form of slide container embodying the invention, with the slides in their normally packed condition;

FIG. 7 is a view similar to that of FIG. 6, showing the slides in their separated, stored relation within the container;

FIG. 8 is a sectional view taken on the line 8—8 of FIG. 7;

FIG. 9 is a top plan view of a slide container showing still another form of the invention, with the slides in packed relation;

FIG. 10 is a view similar to that of FIG. 9, showing the slides in their separated, stored relation;

FIG. 11 is a top plan view similar to that of FIG. 1, showing still another embodiment of the invention;

FIG. 12 is a view similar to that of FIG. 11 with the slides in their separated, stored condition;

FIG. 13 is a sectional view taken on the line 13—13 of FIG. 11;

FIG. 14 is a side elevational view, in section, showing still another embodiment of the invention, with the slides in packed, contacting relation;

FIG. 15 is a top plan view of the container shown in FIG. 14, with the slides in separated, stored relation;

FIG. 16 is a view similar to that of FIG. 14, showing a further embodiment of the invention;

FIG. 17 is a top plan view of the container shown in FIG. 16, with the slides in separated, stored relation;

Figure 18:
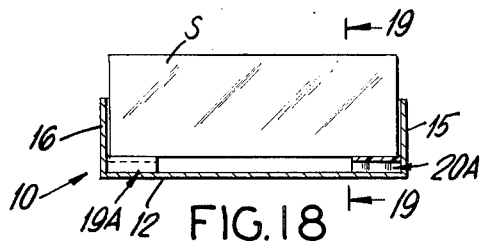
FIG. 18 is a side elevational view, in section, showing still another embodiment of the invention, with the slides in packed, contacting relation.

Referring in detail to the drawing, FIGS. 1–5, 10 designates a container embodying the invention, toegther with a telescoping cover 11 for the same. Such container and cover are made of substantially rigid material such as cardboard or the like. Container 10 comprises a bottom wall 12, upstanding side walls 13, 14 and upstanding end walls 15, 16.

The container 10 is dimensioned to receive therein a predetermined number of glass microscope slides S disposed in side by side, packed, contacting relation. Such slides are typically of 1″ x 3″ dimensions and are packed a half gross (72) to the container. The walls 13–16 have a height somewhat less than the width of slides S, to allow the upper edge portions of said slides to project above the upper edges of the walls of the container and thereby facilitate the removal of the slides from the container.

The cover 11 has the usual depending walls 17 extending from top wall 18, the cover being telescoped relative to container 11 to bring said depending walls 17 into snug fit with the container walls 13–16. The lower edges of cover walls 17 extend to a point slightly raised above container bottom wall 12 when the cover top wall 18 rests on the top edges of the slides S within the container 11.

Means is provided for retaining the slides S in a tightly packed condition within container 10 to avoid breakage, surface scratching and the like. To this end, a pair of similar rectangular packing strips 19, 20 are provided. Such strips are formed of molded resin such as cellulose acetate, vinyl, polystyrene or the like.

The strips 19, 20 are formed on one side thereof with transversely extending, parallel grooves 21 which may be of rectangular cross section and are defined by spaced parallel ribs 22 extending from a web 23, such web being of selected thickness. The strips 19, 20 have a length to allow the same to be snugly received at their opposite ends between side walls 13, 14; and a combined width such that when in their vertically superposed position, as shown in FIG. 2, they equal the width of slides S.

Packing strips 19, 20 are normally disposed in contact with one end wall 15 or 16 of container 10 and an end slide S of the pack of slides disposed within said container so as to tightly retain the pack of slides within the container, which slides individually extend between container slide walls 13, 14. Thus, scratching of the opposed contacting surfaces of the slides is avoided and breakage is minimized.

When cover 11 is removed from container 10 and slides S are removed therefrom in the conventional manner, to be used to receive thereon smears, tissue mounts and the like; the strips 19, 20 are also removed from container 10 and reinserted therein in a rearranged manner as shown in FIGS. 4, 5.

Thus, strip 19 is left in contact with container end wall 16 while strip 20 is disposed in contact with end wall 15; the grooves 21 of said strips being in paired longitudinal alignment. Individual processed slides S may now be turned so that their ends extend toward the container end walls 15, 16 and they may be inserted into paired grooves 21 of strips 19, 20 to store and file the same within the original container 10. Such storage may be of a temporary nature, pending later transfer of the slides S to conventional slide filing boxes and cabinets.

For the purpose of illustration, filler strips 19, 20 which have a length of 3", equal to the length of slides S, are formed with grooves 21 to accommodate from about 20 to about 25 slides S. It will be apparent that the container 10 and strips 19, 20 are suitably dimensioned so that slides S will be properly received in the paired grooves 21 of said strips. Also, such dimensions are selected to prevent excessive longitudinal spacing between a pair of aligned grooves 21, which would allow for lateral dislodgement of slides S at the ends thereof from end receiving grooves 21.

Thus, the overall thickness A of strips 19, 20 must be such as to hold the selected number of slides S, which have a combined thickness of B, tightly betwen the end walls 15, 16 in their normally packaged condition, as indicated in FIG. 1. Also, the distance C between the web portions 24 of a pair of aligned slots 21, when strips 19, 20 are in opposed relation, as shown in FIG. 5; must be at least equal to the length of slides S so as to readily receive the same, when the sildes are to be filed and stored.

Furthermore, the distance D between the web portion 24 of the groove 21 of one of the strips 19 or 20, and the outer surface of the ribs 22 which define the groove 21 on the opposed strip 19 or 20 aligned with the first mentioned groove 21, must be less than the length of slides S to prevent lateral dislodgment of a slide S at either end thereof, from the receiving grooves 21.

As shown in FIG. 3, the web 23 of strips 19, 20 may be formed with a convexly curved surface 25 forming the bottom of grooves 21 and extending between the top and bottom edges of strips 19, 20. Such curved surface 25 provides a groove whose depth is tapered from the opposite ends to the mid-portion thereof, thereby facilitating the insertion of slides S into the paired grooves 21 when packing strips 19, 20 are in their opposed slide receiving relation within container 20.

It is understood that strips 19, 20 may be molded, cut or otherwise formed to provide the grooves 21 therein; and may be derived from various materials other than synthetic resins, including cellulose, boxboard and the like, such materials having varying degrees of shock absorbency, resilience and the like.

As shown in FIGS. 6–8, illustrating another embodiment of the invention, container 10A has packing portions 19A integrally molded with the opposed walls 16A, 15A thereof. Packing portions 19A include grooves 21A and intervening ribs 22A. Slides S are packed in container 10A with their opposite ends extending to walls 13, 14 thereof, said slides being disposed at right angles to the grooves 21A and ribs 22A. The spacing between walls 15A, 16A is such as to allow individual slides S to be turned and inserted in aligned grooves 21A, as indicated in FIG. 7 to space and store the same. It will be apparent that the opposed walls 13, 14; 15A, 16A are spaced to snugly accommodate the pack of slides S in their contacting, packed condition, yet allowing for their spaced, storage position when said slides are turned at right angles to their packed position.

Another embodiment of the invention is shown in FIGS. 9, 10 wherein container 10B is silimar to container 10A, shown in FIG. 6, except that opposed walls 16B, 15B are somewhat longer than corresponding walls 16A, 15A to extend the spacing between walls 13, 14 to allow a group of additional slides S' to be packed in contacting relation and at right angles to packed slides S. Walls 16B, 15B are grooved as at 21B but are left free of grooves at one end thereof 30, 31 to thereby accommodate the group of slides S' therebetween. The slides S or S' may be separated and stored in opposed grooves 21B, as shown in FIG. 10.

Also, a further embodiment of the invention shown in FIGS. 11–13, comprises a slide container 40 of rectangular shape with a packing and rack portion 41 integrally molded with wall 42 thereof, said rack portion 41 having alternating grooves 43 and ribs 44. A packing and rack strip 45 having alternating grooves 46 and ribs 47 is mounted on portion 41, as shown in FIG. 11 to permit slides S to be packed in contacting relation to each other between wall 48 and integral packing portion 41 and removable packing strip 45. Strip 45 may be removed from said position to be relocated against wall 48 with its grooves 46 and ribs 47 in alignment with grooves 43 and ribs 44 of integral portion 41, to allow slides S to be stored in spaced relation, see FIG. 12.

Still another embodiment of the invention is shown in FIGS. 14, 15, wherein slide container 50, having opposed walls 51, 52; 53, 54 and bottom wall 55, is provided on bottom wall 55 with integral molded strip portions 56, 57 which extend to walls 51, 52 and abut walls 53, 54 respectively. Each of strip portions 56, 57 is formed with alternating grooves 58 and ribs 59.

As indicated in FIG. 14, slides S are packed in contacting relation between strip portions 56, 57 while additional packed slides S' in contacting relation are disposed on strip portions 56, 57 and extending at right angles to the grooves 58 and ribs 59 thereof. As shown in FIG. 15, slides S or S' may be turned at right angles from their packed position, to be located in aligned grooves 58 of strip portions 56, 57 and upstanding therefrom to separate and store the same.

In FIGS. 16, 17, slide container 50A is similar to container 50 except that the bottom wall 55 thereof is formed with ribs 59A extending continuously to walls 53, 54 with intervening grooves 58A. Slides S are packed in contacting relation and in upstanding position and at right angles to ribs 59A, see FIG. 16, while said slides S may be turned for insertion into upwardly opening grooves 58A, see FIG. 17, for separation and storage.

Figure 20:
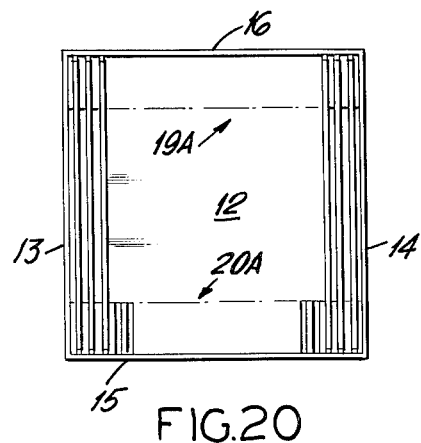
FIG. 20 is a top plan view of the container of FIG. 18, showing the slides in separated, stored relation.
Figure 19:
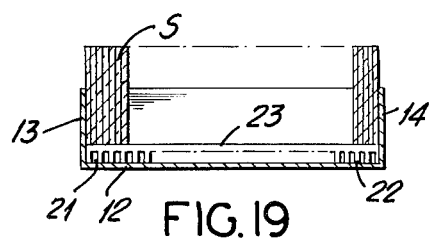
FIG. 19 is a sectional view taken on the line 19—19 of FIG. 18.

In FIGS. 18–20, slide container 10 has grooved packing strips 19A, 20A lying on bottom wall 12, with the grooves 21 and ribs 22 facing the bottom wall, FIGS. 18, 19, thus allowing the packed contacting slides to stand on the smooth web portions 23 thereof. When the slides S are removed from container 10, the strips 19A, 20A are removed, inverted and replaced on bottom wall 12 to dispose grooves 21 opening upwardly to receive slides S therein for separation and storage, FIG. 20.

Figure 21:
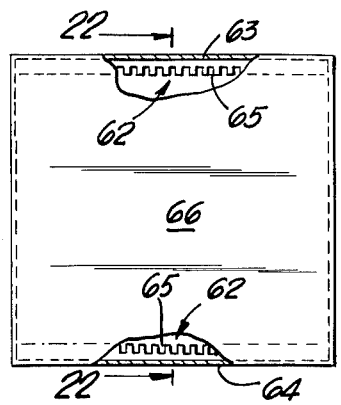
FIG. 21 is a top plan view of a cover member for a slide box, with parts cut away, which includes storage means for slides.
Figure 22:
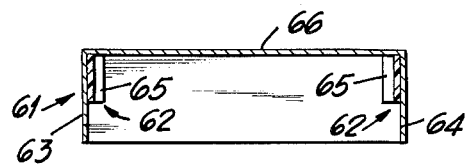
FIG. 22 is a sectional view taken on the line 22—22 of FIG. 21.
Figure 23:
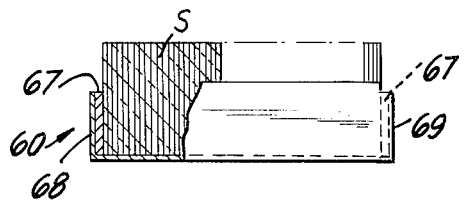
FIG. 23 is a side elevational view of the box associated with the cover of FIGS. 21, 22, showing the slides in packed, contacting relation.

Alternatively, slides S may be packed in a container 60 having a cover 61, FIGS. 21–23, wherein cover 61 is provided with grooved rack strips 62 secured to opposed walls 63, 64 thereof. Opposed strips 62 have their grooves 65 in respective alignment, said strips 62 having a depth less than that of container walls 63, 64 and extending to top wall 66.

Container 60 carries packed, contacting slides S with packing strips 67 disposed against walls 68, 69 thereof to space the outermost slides S inwardly of container walls 68, 69, thereby allowing rack strips 62 on cover 61 to clear the same when cover 61 is placed on container 60 and its contents. In this case, on removing cover 61 and inverting the same, said cover 61 is adapted to hold slides S with the ends thereof received in the grooves 65 of strips 62 to space and store the same.

As various changes might be made in the embodiment of the invention herein disclosed without departing from the spirit thereof, it is understood that all matter herein shown or described shall be deemed illustrative and not limiting except as set forth in the appended claims.

What is claimed is:

1. Combination container and filing device for glass slides comprising container means and cover means, each of said means having bottom, side and end walls, and a pair of vertically superposed filler strips normally disposed against one end wall of said container means for tightly retaining a pack of glass slides in side by side surface contacting relation within said container means, said container side walls being spaced at a distance equal to the length of said slides whereby the opposite ends of said pack of slides abut said opposed container side walls, each of said filler strips being formed with transversely extending, parallel spaced grooves having a width equal to the thickness of one slide, said strips being respectively disposable against the opposed end walls of said container means after the pack of slides have been removed therefrom, with respective pairs of opposed grooves in longitudinal alignment, the end walls of said container means having a spacing therebetween to permit the respective pairs of aligned grooves to receive therein selected slides and to maintain said selected slides in spaced relation for storage and filing within said container.

2. Combination container and filing device for a pack of contacting glass slides, said container comprising a bottom wall, side and end walls upstanding from said bottom wall, a pair of rectangular filler strips having a length equal to the length of said slides, said strips being normally disposed in vertically superposed relation in contact with one end wall of said container and the outermost slide at one end of said pack of slides, said container end walls having a spacing therebetween to tightly pack said slides within said container with the opposite ends of said slides extending to the opposite side walls of said container, each of said filler strips being formed with transversely extending parallel ribs to provide grooves therebetween, said filler strips being respectively disposable against the opposite end walls of said container after the pack of slides has been removed therefrom, the grooves in said strips being disposed in respectively opposed and longitudinally aligned pairs, each pair of grooves being longitudinally spaced to receive and retain a single glass slide therein.

3. Combination container and filing device as in claim 2 wherein said container end walls are spaced at a distance equal to the thickness of one of said filler strips plus the thickness of said pack of slides, whereby a predetermined number of contacting slides are tightly packed in parallel arrangement relative to said end walls between one end wall and said filler strips, the distance between the bottom walls of the paired longitudinally aligned grooves of said filler strips when said strips are in respective contact with the opposite container end walls being at least equal to the length of said slides, and the distance between the bottom wall of one groove of said pair of grooves and the outer surface of the ribs forming the groove aligned with said one groove being less than the length of said slides to prevent lateral displacement of end portions of said slides from the grooves receiving said slides.

4. Combination container and filing device as in claim 2 wherein the bottom wall of the grooves in said filler strips comprise a convexly curved surface extending from end to end thereof whereby the depth of said grooves is tapered from the opposite ends to the mid-portion thereof.

5. Combination container and filing device for a pack of contacting glass slides comprising a bottom wall, end walls and side walls upstanding from said bottom wall, a pair of filler strips in vertically superposed relation normally disposed between and in contact with one end wall and the outermost slide at one end of said pack of slides to tightly retain said slides within said container, each filler strip being formed with parallel grooves extending transversely thereof, the filler strips being disposable in contact with the respective container end walls after the slides have been removed therefrom, the grooves in said filler strips being disposed in longitudinally aligned pairs, the side walls of said container having a spacing equal to the length of said slides to snugly receive the opposite ends thereof therebetween in the packed position of said slides, the end walls of said container having a spacing equal to at least the length of said slides plus twice the thickness of the web portion of one of said filler strips.

6. Combination container and filing device for a pack of contacting glass slides comprising a bottom wall, side and end walls upstanding from said bottom wall, said side walls having a spacing equal to the length of said slides, a pair of filler strips removably disposed between and in contact with one end wall and the outermost slide at one end of said pack of slides, said container end walls having a spacing therebetween slightly greater than the thickness of said pack of slides whereby said filler strips are operative to tightly retain said slides within said container in parallel relations to said end walls, said strips being respectively disposable in contact with the opposite end walls after the slides have been removed from said container, said strips including means for engaging end portions of said slides and retaining said slides in spaced parallel relation and parallel to said side walls.

7. Combination container and filing device for a pack of glass microscope slides in side by side, surface contacting relation, said container comprising a bottom wall, a pair of opposed side walls and a pair of opposed end walls upstanding from said bottom wall, slide separator and filler means on at least one of said walls, said separator and filler means comprising alternating parallel ribs and grooves, the grooves having a width equal to the thickness of one slide, said pack of slides in their surface contacting relation being tightly packed within said container with said filler means being disposed between and in contact with one of said end walls and the outermost slide at one end of said pack of slides, said side walls having a spacing therebetween equal to the length of said slides and said end walls having a spacing therebetween somewhat greater than the length of said slides, said pack of slides being removable from said container and selected slides therefrom being adapted to be filed within said container by disposing individual slides in parallel relation to said side walls and at right angles to said separator means and with edge portions thereof received in said grooves to space said selected slides from each other and to maintain said selected slides in spaced relation within said container.

8. A slide container as in claim 7 wherein said slide separator means comprises a pair of separator portions respectively disposed on the inner surface portions of said end walls, each separator portion comprising parallel, alternating ribs and grooves, the grooves of one separator portion being respectively longitudinally aligned with the grooves of the other separator portion whereby each of the selected slides may have their opposite end edges received in a pair of aligned grooves in said pair of separator portions.

9. Combination container and filing device for glass slides comprising container means and cover means for said slides, each of said means including opposed side walls, opposed end walls and a wall interconnecting said side and end walls, grooved slide separator and holding means located within one of said means, said grooved means being disposed to allow said slides to be packed in surface contacting relation to each other with their ends extending to one set of opposed walls, said grooved means being further adapted to receive edge portions of selected slides to dispose said slides in spaced, stored relation to each other.

10. Combination container and filing device for glass slides comprising rectangular container means including a container member having opposed end walls, opposed side walls and a bottom wall interconnecting said end and side walls, combination filler and slide spacer means within said container means, said slide filler and spaced means comprising alternating rib and groove portions, said filler and spacing means being disposed within said container means to allow said slides to be disposed in side by side packed, contacting relation between one pair of opposed walls of said container means, and extending to the other pair of opposed walls, said slides being adapted to be turned to positions at right angles to said packed position thereof and receivable in the groove portions of said filler and spacing means for spacing and storing said slides.

11. A slide container and filing device as in claim 10 wherein said filler and spacing means is integral with each of one pair of opposed walls with the grooves on one of said pair of opposed walls in alignment with the grooves on the other of said pair of opposed walls.

12. A slide container and filing device as in claim 9 wherein said one pair of opposed walls comprises opposed, smooth walled portions at one end thereof for receiving therebetween a plurality of contacting slides in packed relation disposed at right angles to said first mentioned packed slides.

13. A slide container and filing device as in claim 10 wherein said filler and spacing means comprises one portion integral with one of said one pair of opposed walls and a second portion removably superposed on said one portion for positioning in contact with the other of said one pair of opposed walls to dispose the grooves thereof in respective alignment with the grooves of said one portion.

14. A slide container and filing device as in claim 10 wherein said filler and spacing means is located on the bottom wall of said container member with the grooves thereof opening upwardly, said slides being receivable in said grooves to space and file the same.

15. A slide container and filing device comprising a rectangular container and cover for said container, said container being adapted to receive therein a plurality of slides in packed contacting relation to each other, said cover including grooved means on opposed wall portions thereof, said cover being removable from said container for inversion to mount therein a plurality of said slides respectively received in aligned pairs of grooved means on said opposed wall portions thereof.

References Cited by the Examiner

UNITED STATES PATENTS

| 1,030,534 | 6/1912 | Pooler | 312—10 |
| 1,997,820 | 4/1935 | Govoni. | |
| 2,829,767 | 4/1958 | Stripture | 206—73 |
| 2,868,606 | 1/1959 | Stierna | 312—10 |
| 2,875,010 | 2/1959 | Sola et al. | 312—200 |

THERON E. CONDON, *Primary Examiner.*